(12) United States Patent
Rustomji et al.

(10) Patent No.: US 12,113,245 B1
(45) Date of Patent: Oct. 8, 2024

(54) BATTERY CELL DESIGN FOR IMPROVED SAFETY

(71) Applicant: SOUTH 8 TECHNOLOGIES, INC., San Diego, CA (US)

(72) Inventors: Cyrus S. Rustomji, San Diego, CA (US); Frederick Krause, Carlsbad, CA (US); Jungwoo Lee, San Diego, CA (US); Lasantha Korala, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/643,134

(22) Filed: Apr. 23, 2024

Related U.S. Application Data

(60) Provisional application No. 63/461,387, filed on Apr. 24, 2023.

(51) Int. Cl.
*H01M 50/572* (2021.01)
*H01M 50/166* (2021.01)
*H01M 50/342* (2021.01)

(52) U.S. Cl.
CPC ....... *H01M 50/572* (2021.01); *H01M 50/166* (2021.01); *H01M 50/342* (2021.01); *H01M 2200/20* (2013.01)

(58) Field of Classification Search
CPC . H01M 50/572; H01M 50/342; H01M 50/166
See application file for complete search history.

(56) References Cited

U.S. PATENT DOCUMENTS

| 8,557,418 | B2 | 10/2013 | Byun | |
|---|---|---|---|---|
| 10,361,421 | B2 | 7/2019 | Lee et al. | |
| 2014/0227564 | A1* | 8/2014 | Song | H01M 50/342 429/53 |
| 2021/0313611 | A1* | 10/2021 | Rustomji | H01M 10/052 |

FOREIGN PATENT DOCUMENTS

| JP | 2004319463 | 11/2004 |
|---|---|---|
| JP | 2004319463 A * | 11/2004 |

OTHER PUBLICATIONS

JP 2004319463 Translation (Year: 2004).*
ISR for PCT/US2024/025771 dated Jul. 2, 2024 (12 pages).

* cited by examiner

*Primary Examiner* — Jimmy Vo
(74) *Attorney, Agent, or Firm* — Manuel de la Cerra (57) ABSTRACT

The present invention discloses an electrochemical cell design that safely discharges after cell venting. The cell includes a housing and a lid assembly connected to the housing via a vent. The housing houses an electrode assembly with a first electrode separated from a second electrode by a separator. The first electrode is electrically connected to the housing, and the second electrode is electrically connected to the lid assembly structure. The cell has a non-venting configuration characterized by the vent connecting the lid assembly to the housing such that the internal pressure is maintained at a pressure above atmospheric pressure. A venting configuration is characterized by (A) the vent releasing the housing from the lid assembly when a predetermined internal pressure is exceeded; (B) venting the internal pressure; and (C) the venting dislodging the lid assembly such that it makes electrical contact with the housing, thus discharging the cell.

27 Claims, 6 Drawing Sheets

(Non-Venting Configuration)

FIG. 1B
(Venting Configuration with Vent-Induced Lid Assembly Short and No Coning)

FIG. 1A
(Non-Venting Configuration)

FIG. 1C
(Venting Configuration with Vent-Induced Coning Short and No Lid Assembly Short)

FIG. 1D
(Venting Configuration with Vent-Induced Coning Short and No Lid Assembly Short)

FIG. 1F
(Venting Configuration with Vent-Induced Coning Short and Vent-Induced Lid Assembly Short)

FIG. 1E
(Venting Configuration with Vent-Induced Coning Short and a Vent-Induced Lid Assembly Short)

FIG. 1H
(Venting Configuration with Vent-Induced Coning Short and Vent-Induced Cell Housing Short)

FIG. 1G
(Non-Venting Configuration)

FIG. 2C
(After Venting, Vent-Induced Coning)

FIG. 2B
(After Venting, Vent-Induced Coning)

FIG. 2A
(Before Venting, No Coning)

FIG. 3

BATTERY CELL DESIGN FOR IMPROVED SAFETY

CROSS-REFERENCE TO RELATED APPLICATIONS

This patent claims priority to U.S. Application 63/461,387 filed on Apr. 24, 1923, the entire contents of which are hereby incorporated by reference.

This application is also related to the following applications and patents, each of which is hereby incorporated by reference in its entirety: U.S. Pat. No. 10,608,284 issued on Mar. 31, 1920; U.S. Pat. No. 10,998,143 issued on May 4, 1921; U.S. Pat. No. 10,784,532 issued on Sep. 22, 1920; U.S. Pat. No. 11,088,396 issued Aug. 10, 1921; U.S. Pat. No. 10,873,070 issued on Dec. 22, 2020; U.S. Pat. No. 11,342,615 issued on May 24, 1922; PCT/US20/26086 filed on Apr. 1, 2020; PCT/US22/31594 filed on May 31, 1922; PCT/US23/11864 filed on Jan. 30, 1923; PCT/US23/17720 filed on Apr. 6, 2023; PCT/US23/28104 filed on Jul. 19, 1923; PCT/US23/28105 filed on Jul. 19, 1923; PCT/US23/35766 filed on Oct. 24, 1923; PCT/US24/16784 filed on Feb. 21, 1923; PCT/US24/18746 filed on Mar. 6, 1924; PCT/US24/16784 filed on Feb. 21, 1924; U.S. Application 63/418,703 filed on Oct. 24, 1922; U.S. Application 63/461,252 filed on Apr. 22, 1923; U.S. Application 63/461,387 filed on Apr. 24, 1923; U.S. Application 63/470,174 filed on May 31, 1923; U.S. Application 63/534,213 filed on Aug. 22, 1923; and U.S. Application 63/450,745 filed on Mar. 8, 1923.

FIELD OF THE INVENTION

Embodiments of the invention relate to electrochemical cell designs and to safety mechanisms for energy storage devices to allow them to safely fail under physical or electrical abuse.

BACKGROUND OF THE INVENTION

Typical battery cells, such as Li-ion cells, often catch fire after undergoing electrical or physical abuse or from manufacturing flaws. This may be hazardous to operators and may also lead to a loss or damage of property. Current Li-ion cells have integrated devices to improve safety under abuse, such as current interrupt devices that are enabled under increased cell pressure, pressure release vents, and thermal switches that disable current flow when the cell warms beyond a set temperature.

Other unique cell configurations are also possible to improve safety. One such configuration is provided herein. A unique mechanism is described to intentionally discharge a cell after cell failure. A discharged cell will have significantly less stored energy and will allow the cell to fail safely with less risk of fire or other hazards. The cell discharge is activated by the cell venting, during which the mechanical configuration of the cell changes such that the positive electrode is electrically shorted with the negative electrode, thus discharging the cell.

SUMMARY OF THE INVENTION

The present invention discloses an electrochemical cell design that safely discharges after cell venting. The cell includes a housing, a lid assembly connected to the housing via a vent. The housing houses an electrode assembly with a first electrode separated from a second electrode by a separator. The first electrode is electrically connected to the housing, and the second electrode is electrically connected to the lid assembly structure. The cell has a non-venting configuration characterized by the vent connecting the lid assembly to the housing such that the internal pressure is maintained at a pressure above atmospheric pressure. The cell also has a venting configuration characterized by (A) the vent releasing the housing from the lid assembly when a predetermined internal pressure is exceeded; (B) venting the internal pressure; and (C) the venting dislodging the lid assembly such that it makes electrical contact with the housing, thus discharging the cell.

The first electrode, the second electrode and the separator may be wound together, and the venting configuration is further characterized by the venting of the internal pressure at least partially unwinding the electrode assembly such that the first electrode makes electrical contact with the second electrode and/or the lid assembly, thus discharging the safety cell.

The safety cell may also have an electrolyte within the cell housing. The electrolyte may be a liquid. It also may be a liquified gas electrolyte with a solvent with a vapor pressure above an atmospheric pressure of 100 kPa at a temperature of 293.15 K.

The vent may be a score. The score may be, but is not limited to: a full circle, a half circle, two nearly complete half circles, a nearly complete single circle, a square or a rectangle. The vent may be a burst disc.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention, as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

Cell Housing 1
Cell Housing Bottom Wall 1-1
Cell Vent (Before Cell Vent) 2
Electrical Lid Assembly 3
Electrode Tab (+/−) in Electrical Contact with Lid Assembly 4
Electrode Assembly with First Electrode (+/−), Second Electrode (+/−), and Separator 5
Electrode Tab (+/−) in Electrical Contact with Cell Housing 6
Electrical Insulator 7
Shorting Structure 7-1
Shorting Structure in an Open-Circuit Position 8
Shorting Structure in a Closed-Circuit Position 9
Cell Vent (After Cell Vent) 10
"Coning" Short in Venting Configuration 11
Dislodged Lid from Cell in Electrically Shorting Configuration After Vent 12
Electrolyte 13
Shorting Location Between Electrode Assembly and Electrical Lid Assembly in Venting Configuration 14
Lid Assembly Movement During Venting Configuration 20
Electrode Assembly Movement During Venting Configuration 22
Extreme Electrode Assembly Movement During Venting Configuration 24
Coning of the Electrode Assembly 25

In general, the cell vent is on the body of the cell that has a high internal pressure on one side and a low external pressure (e.g., atmospheric pressure) on the opposing side of the vent. The high internal pressure may be generated from the gas evolution within the cell over time due to cell degradation, an increase in temperature that causes an increase in internal cell pressure, an internal shorting leading to thermal runaway, or from a liquefied gas electrolyte that is generally held under some internal pressure to ensure that the gaseous solvents are held in the liquid phase.

In conventional cells, such as cylindrical cells, a vent on the cell may be scored onto a thin metal film that fractures at a set pressure, releasing excess pressure from the cell. Electrical isolation between the first and second electrodes is generally maintained during venting. In contrast, the current invention discloses a unique mechanism to intentionally discharge a cell after cell failure by bringing the first and second electrodes into electrical contact. The cell discharging is activated by cell venting in which the cell venting action modifies the mechanical configuration of the cell, allowing the first electrode to electrically short to the second electrode, thus discharging the cell. A discharged cell will have significantly less stored energy and will allow the cell to fail safely with less risk of fire or other hazards.

In the present inventions, cell venting may modify the mechanical configuration of the cell from a non-electrically shorting configuration to a shorting mechanical configuration through one or more various designs. When the vent opens to vents the cell, a metallic object, or a metallic electrical discharge point, is mechanically displaced by the forces experienced during venting from the pressure of the gas pushing on the metallic object, such that the object may electrically connect and short both the first and second electrodes. The metallic object may be disc-, ribbon-, tab-, or wire-shaped in nature. This object can be attached to the vent assembly, electrical contact assembly, or another part of the cell housing, through welding, or as a solid body. The object may also be designed such that it wedges the electrical contact assembly into the cell housing under a venting action, such that little or no cell housing material is dislodged from the cell. This is an additional area of safety, since any dislodged cell housing material during a venting event can be a hazardous projectile to nearby personnel or equipment.

In another aspect, the rush of pressure during venting will modify the mechanical integrity of the electrode assembly. The electrode assembly is typically a wound structure comprising the first electrode and a second electrode separated by a separator. During venting, the electrode assembly can be forced upwards and layers of the electrodes may "slip" past each other and create an electrical short. This creates a cone geometry to the electrode assembly pointing towards the direction of the vent. This electrical short between electrode layers within the electrode assembly can also be used to discharge the cell.

The vent may be created via a score, or a portion from which material is removed to weaken the section of the material member, on a base material that allows the fracture of the material under pressure to create a puncture in which the gas can escape. The score may be, but is not limited to: a full circle, a half circle, two nearly complete half circles, a nearly complete single circle, a square, or rectangle. The score design is often dependent upon the application requirements, such as vent pressure. The vent may be a portion of the cell lid assembly or may be a portion of the cell housing, preferably on the bottom of the cell housing.

The vent may also be of a burst-disc type, which is a domed-shaped disk that is designed to rupture under a designated pressure. The dome may be designed to face upward or downward, depending on the design and the type of burst disc.

In one configuration, the cell uses a liquefied gas electrolyte. Upon cell venting, the liquefied gas solvent escapes the cell and leaves a high-impedance electrolyte behind in the electrode assembly. This high-impedance electrolyte has sufficient resistance such that, upon cell short circuit in the electrically shorting mechanical configuration, there is insufficient heat generation for any safety hazard to occur. After the cell shorting is completed, the electrodes are left in a safer discharged state. This is beneficial because upon further physical abuse (crush, overheating, etc.), the discharged cell will show significantly less or no safety hazard. Table 1 presents the cell impedance before and after venting for equivalent capacity cells using similar anode (graphite), cathode (NMC811), and separator (polypropylene).

TABLE 1

| | Impedance Before Venting | Impedance After Venting |
|---|---|---|
| Liquid Electrolyte | 0.022 Ohm | 0.023 Ohm |
| Liquefied Gas Electrolyte | 0.021 Ohm | 1.2 Ohm |

A fully-charged cell can have a voltage of about 3V to 5 V. At 5V, a cell containing a liquid electrolyte in the example in Table 1, when vented, would have a short circuit current of 217 Amp (5V/0.023 Ohm=217 Amp), generating a lot of heat through the cell and driving it to thermal runaway and fire. In contrast, a fully charged cell containing a liquefied gas electrolyte that is subsequently vented would have a lower potential for a short circuit current of 4.1 Amp (5 V/1.2 Ohm=4.1 Amp), a considerably lower current that would result in a minimal increase in the temperature of the cell.

A cell containing liquefied gas electrolyte would have a distinct advantage in utilizing the current invention due to the natural increase in impedance after the electrolyte is vented from the cell. However, the discharging action in the electrically-shorting mechanical configuration may also take place through a finely tuned resistance. A too-high resistance might discharge the cell too slowly, which would still allow for safety concerns. A too-low resistance may allow the cell to discharge too quickly and overheat, causing a potential fire to occur. The resistance may be tuned by the geometry of the vent assembly, the type of metal coming into contact, the force applied between the two materials, etc. Thus, a liquid-electrolyte cell in which the impedance remains relatively unchanged before and after cell venting may also be safety discharged through the resistive path, lowering the overall current and heat generation of the cell, preventing further safety hazards.

Figure 1A:
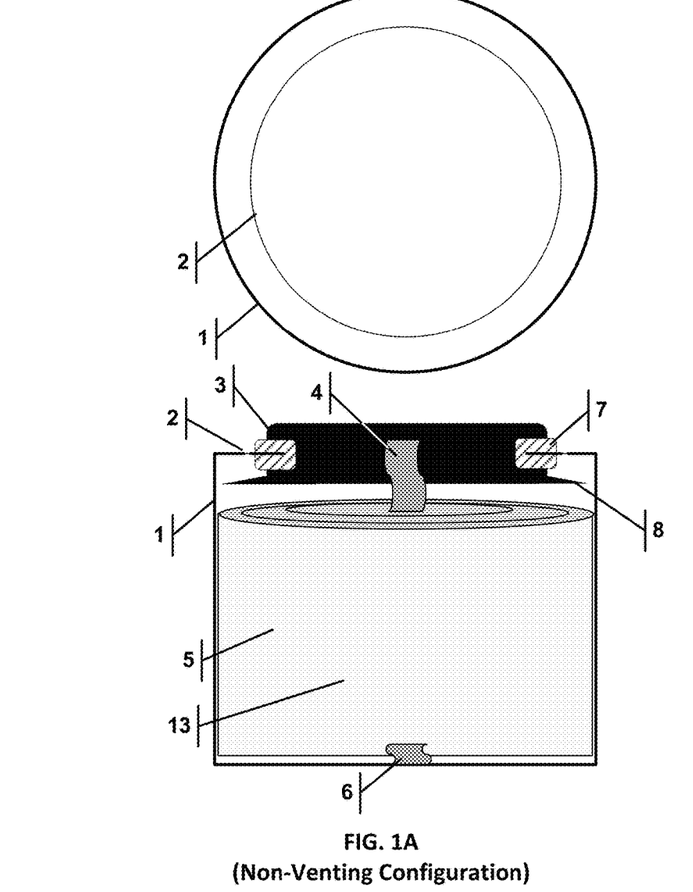
FIG. 1A is a schematic showing a safety cell in the non-electrically shorting, non-venting configuration with a vent on the cell lid assembly.

FIG. 1A shows a schematic of a safety cell in the non-electrically shorting, non-venting configuration. The cell lid assembly 3 has a cell vent 2 that is a weakened portion on the lid assembly 3 in which, under high pressure, the vent 2 can break open (see the opened vent 10 in FIG. 1B) and release the cell's internal pressure. The safety cell also features a cell housing 1 that contains the electrode assembly 5 and the electrolyte 13. The lid 3 is in electrical contact with the electrode tab 4, which is in electrical contact with a first electrode (+/−) within the electrode assembly 5. A second electrode tab 6 is in electrical contact with the cell housing 1 and with a second electrode (+/−) within the electrode assembly 5. The lid assembly 3 also has a shorting structure (7-1) in electrical contact with the first electrode and an electrical insulator 7 that electrically isolates the first electrode from the second electrode. It should be noted that the shorting structure 7-1 is not in electrical contact with the cell housing 1 in the non-venting configuration (see open-circuit position 8).

Figure 1B:
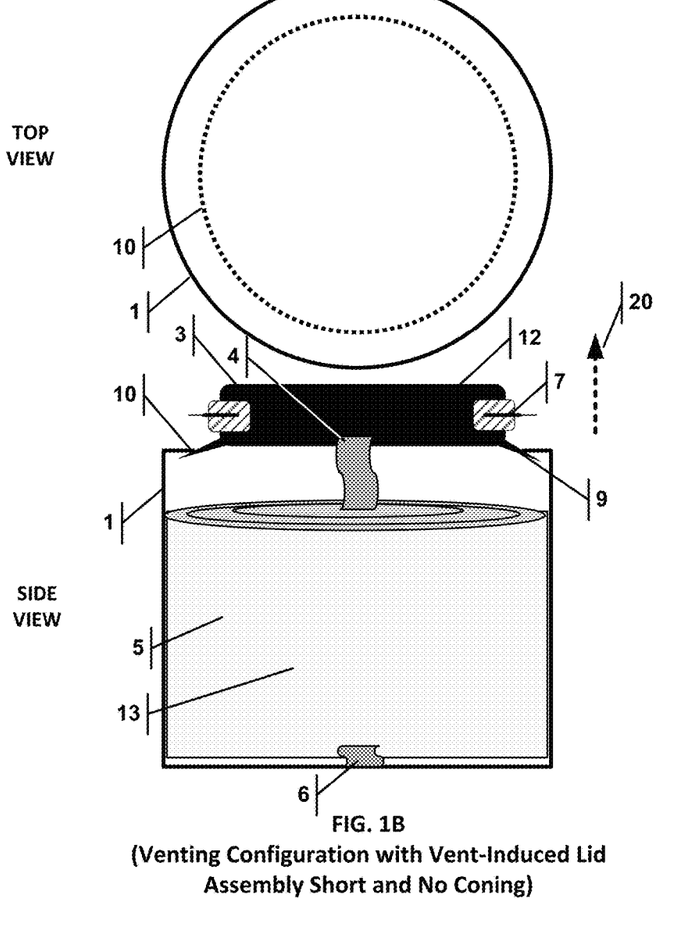
FIG. 1B is a schematic showing a safety cell in the venting configuration with a vent-induced electrical short occurring between the cell lid assembly and the housing, during which the cell lid assembly is dislodged from the cell housing but is not completely separated from the cell housing.

FIG. 1B shows the safety cell in the venting configuration with a vent-induced electrical short occurring between cell lid assembly 3 and the cell housing 1 through the shorting structure 7-1 at position 9. The opened vent 10 allows the internal cell pressure to escape, thus mechanically dislodging the cell lid assembly 3 from the cell housing 1 but not separating the lid assembly 3 from the safety cell. Specifically, the pressure released during venting causes the lid assembly 3 to dislodge and to move upward (see arrow 20) and make physical contact with the cell housing 1 via the shorting structure 7-1, such that the first electrode and second electrode are brought into electrical contact (see closed-circuit position 9). With electrical contact made, the electrodes are shorted, and the safety cell safely discharges.

Figure 1C:
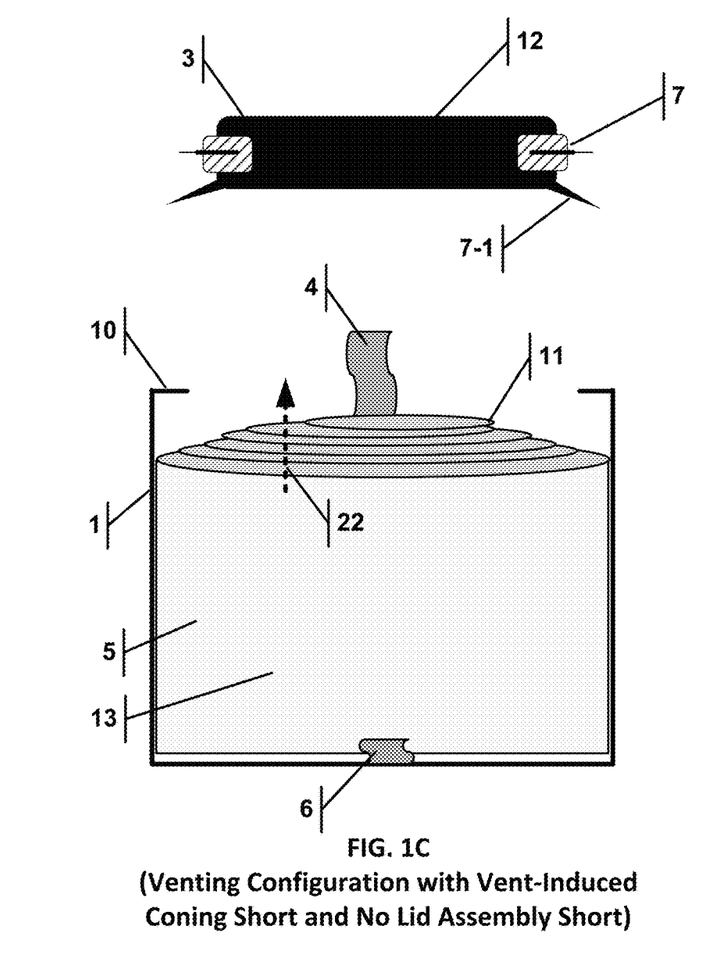
FIG. 1C is a schematic showing a safety cell in the venting configuration with a vent-induced coning electrical short between the first and second electrodes, during which the cell lid assembly is completely dislodged and separated from the cell housing.

FIG. 1C shows the safety cell in the venting configuration with a vent-induced coning electrical short 11 between the first and second electrodes. In this figure, venting does not create an electrical short between the lid assembly 3 and the cell housing because the lid assembly 3 is completely dislodged and separated from the safety cell; thus, there is no electrical short between the lid assembly 3 and the cell housing 1. However, venting of high-pressure gas escaping the safety cell transforms the electrode assembly 5 into an alternate mechanical configuration. The electrode assembly 5 is shown as a "cone" shape where the electrode layers have become dislodged and have slipped into a configuration in which there is an electrically conducting point connecting (and thus shorting) the first and second electrodes at position 11. Ordinarily, the separator within the electrode assembly 5 electrically isolates both the first and second electrodes. When the cell vents, it allows the first and second electrodes to protrude upwards (see arrow 22) and past the portion of the separator to the point where both the electrodes may come into electrical contact with each other. Once the electrodes are in direct contact with each other, they complete a lower-resistance short that will discharge the safety cell. This design is dependent upon how the safety cell is assembled. For example, the electrode assembly 5 may be wound in a tighter or a looser configuration. In a tighter winding, the electrode assembly 5 would have a lower tendency to protrude in a "cone" during venting, and thus the electrodes may not move to the electrically-shorting configuration as easily. In a looser winding, the electrodes may be more easily shifted within the electrode assembly, and thus it would be easier for the electrodes to come into contact and create an electrical short. It would be a preferable to adjust the winding tension of the electrode assembly 5 to allow for the electrodes to be shifted during venting to allow for electrical shorting.

Figure 1D:
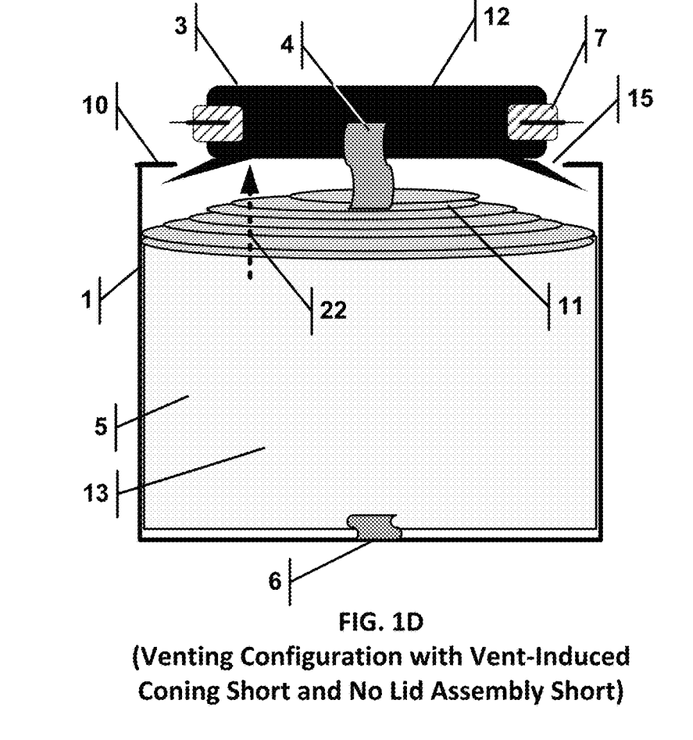
FIG. 1D is a schematic showing a safety cell in the venting configuration with a vent-induced coning short between the first and second electrodes in the electrode assembly, during which the cell lid assembly is dislodged from the cell housing but is not completely separated from the cell housing.

FIG. 1D is similar to FIG. 1C, except the lid assembly 3 is dislodged from the cell housing 1, but does not create an electrical short between the first and second electrodes. Note that the position 9 does not show electrical contact between the shorting structure 7-1 and the cell housing 1. Instead, the electrical short occurs through the "coned" electrode assembly (see arrow 11), as described with respect to FIG. 1C.

Figure 1E:
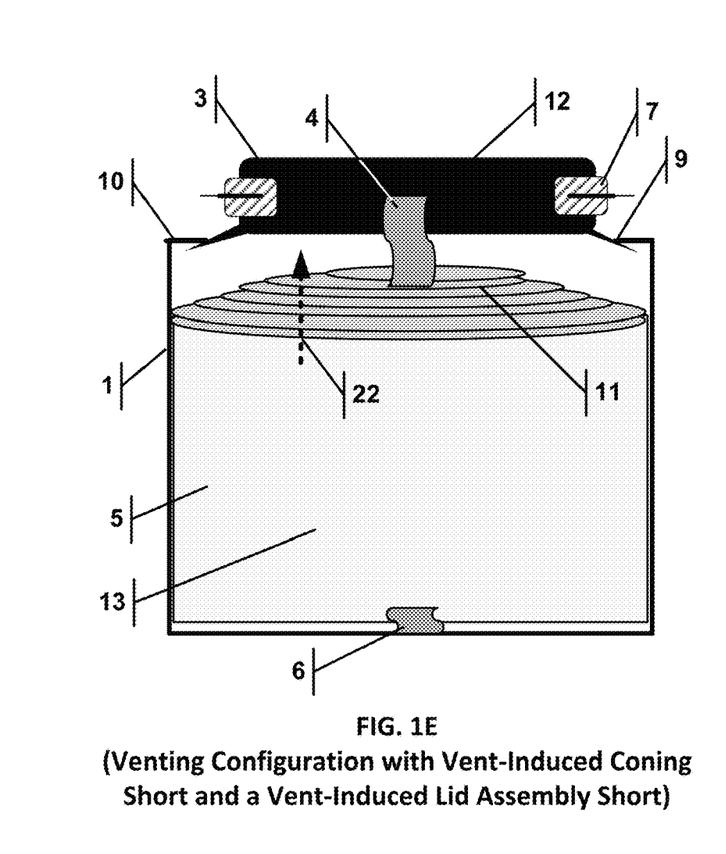
FIG. 1E is a schematic showing a safety cell in the venting configuration with a vent-induced coning short between the first and second electrodes in the electrode assembly, as well as a vent-induced electrical short occurring between the cell lid assembly and the housing, during which the cell lid assembly is dislodged from the cell housing but is not completely separated from the cell housing.

FIG. 1E is a combination of FIGS. 1B and 1D, in which the cell is in the electrically-shorting mechanical configuration both through the closed-circuit position 9 between lid assembly 3 and housing 1, and through the point 11 on the coned electrode assembly 5. Here, the cell lid assembly 3 is dislodged from the cell housing 1 but is not separated from the safety cell.

Figure 1F:
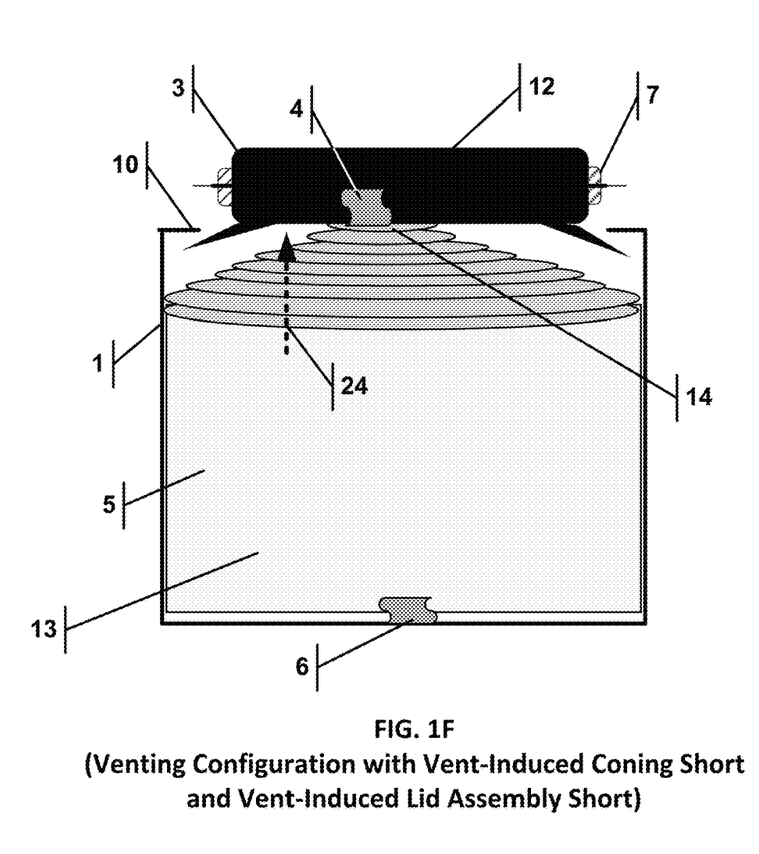
FIG. 1F is a schematic showing a safety cell in the venting configuration with a vent-induced coning short between the first and second electrodes in the electrode assembly, and as well as vent-induced electrical short occurring between the cell lid assembly and the electrode assembly, during which the cell lid assembly is dislodged from the cell housing but is not completely separated from the cell housing.

FIG. 1F shows a safety cell in the venting configuration with a vent-induced coning short 11 between the first and second electrodes in the electrode assembly 5. This figure also shows an extreme electrode assembly 5 movement during the venting event (arrow 24), causing the electrode assembly 5 to contact and short with the lid assembly 3, thus discharging the safety cell.

Figure 1G:
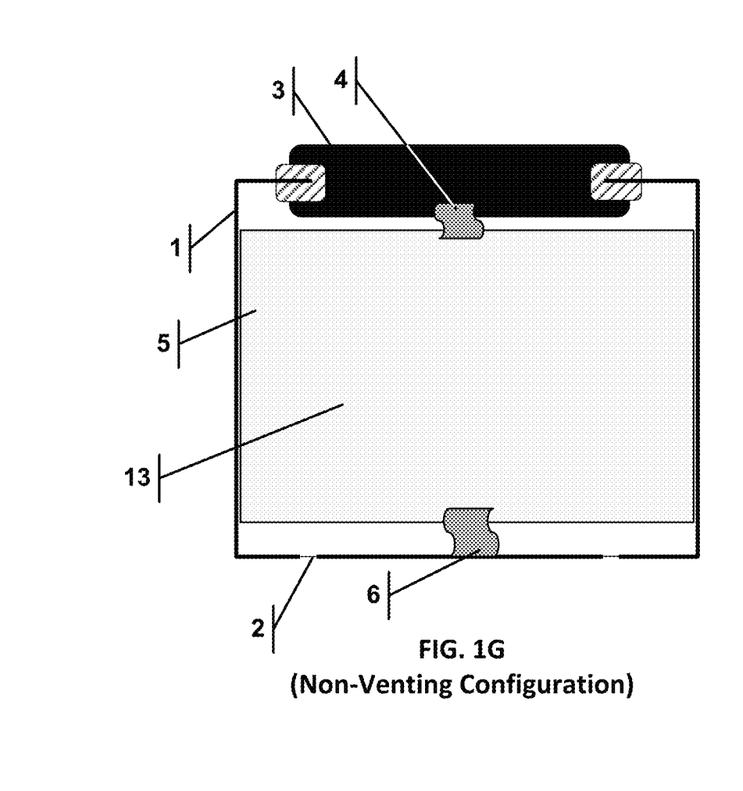
FIG. 1G is a schematic showing a safety cell in the non-electrically shorting, non-venting configuration with a vent on the bottom of the cell housing.
Figure 1H:
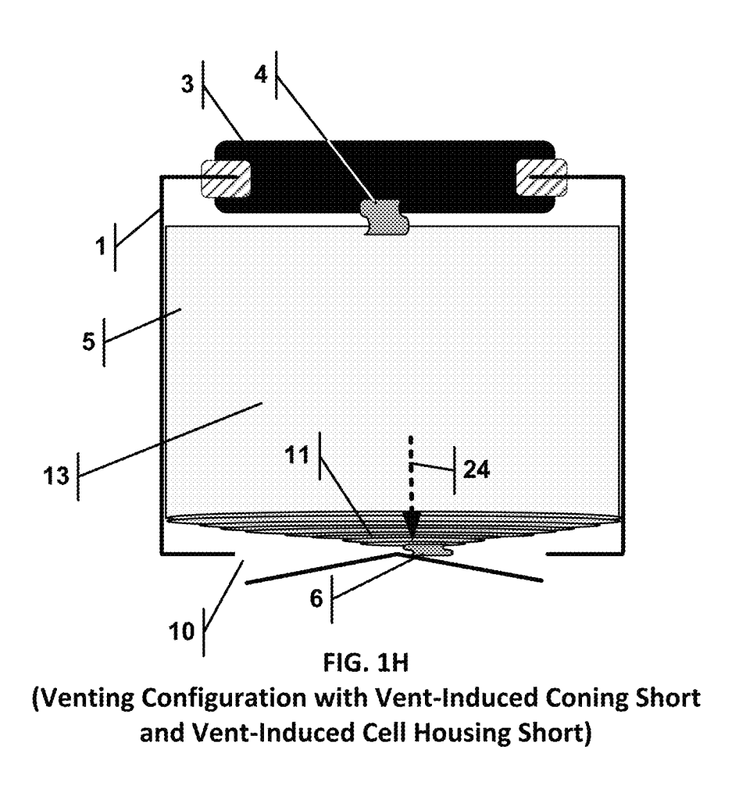
FIG. 1H is a schematic showing a safety cell in the venting configuration with a vent-induced coning short between the first and second electrodes in the electrode assembly with the vent opening on the bottom of the cell housing.

FIG. 1G shows a schematic of a safety cell in the non-electrically shorting, non-venting configuration with a vent 2 on the bottom wall 1-1 of the cell housing 1. FIG. 1H shows a safety cell in the venting configuration, with the opened vent 10 on the bottom wall 1-1 of the cell housing 1, with a vent-induced coning short 11 between the first and second electrodes in the electrode assembly 5. This figure also shows an extreme electrode assembly 5 movement during the venting event (arrow 24), causing the electrode assembly 5 to contact and short with the cell housing 1, thus discharging the safety cell.

It is possible to tune the amount of coning by selecting the correct winding tension in the electrode assembly 5. For example, the electrode assembly 5 would be tightest in FIGS. 1A and 1B, resulting in little to no coning and thus no vent-induced cone shorting. The electrode assemblies 5 in FIGS. 1C and 1D are wound less tightly, allowing for some coning, while FIGS. 1E and 1F are wound even less tightly to allow for extreme coning (compare the movement arrows 22 and 24).

Figure 2A:
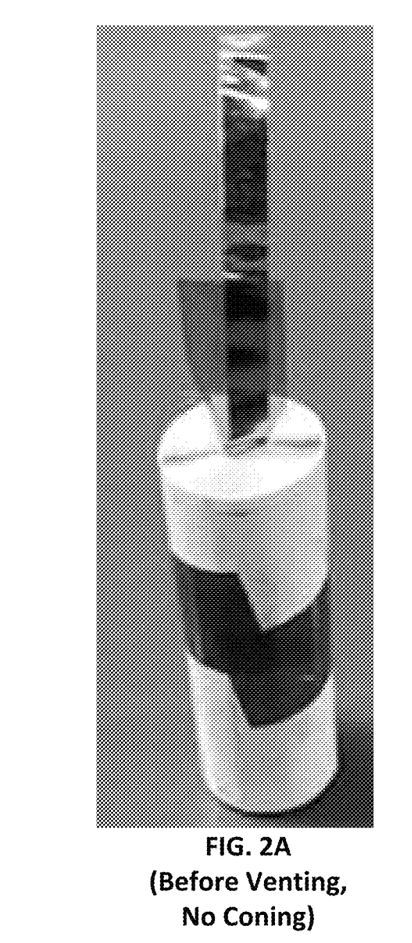
FIG. 2A shows the electrode assembly before venting.
Figure 2B:
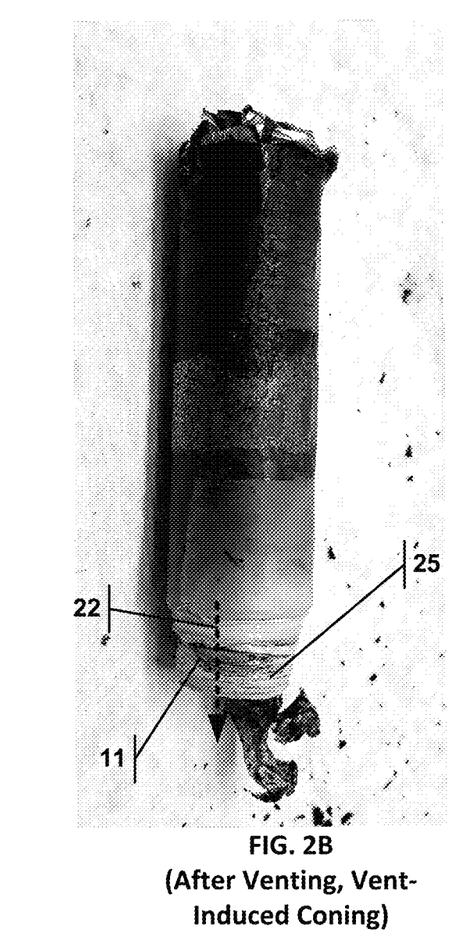
FIG. 2B is a first view of the electrode assembly after venting with the "coning" of the electrodes in the direction of the vent action.
Figure 2C:
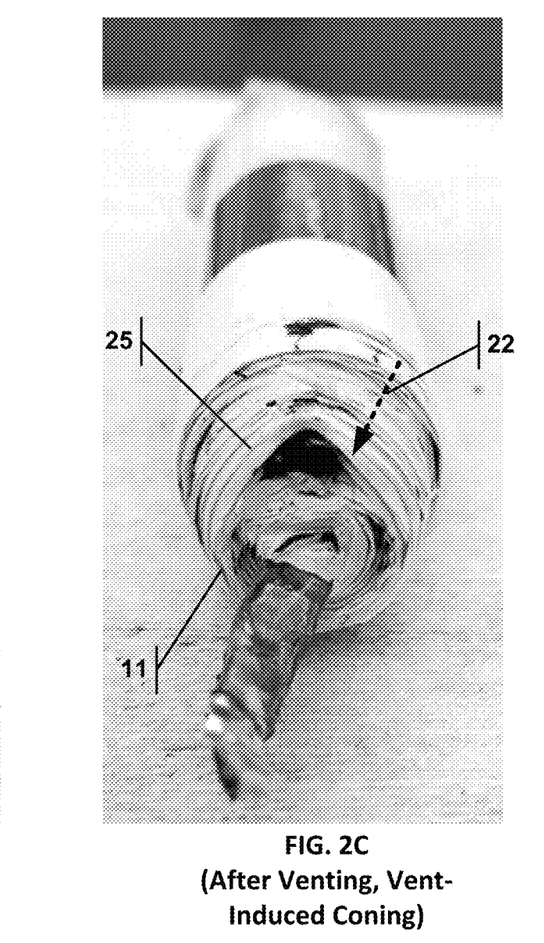
FIG. 2C is a second view of the electrode assembly after venting with the "coning" of the electrodes in the direction of the vent action

FIGS. 2A-2C are images of the electrode assembly 5 before and after venting. FIG. 2A shows the electrode assembly before venting. FIG. 2B shows a first view of the electrode assembly after venting with the "coning" 25 of the electrodes in the direction of the vent action. Venting propels the first and second electrodes in the electrode assembly 5 "cone" upwards and past a portion of the separator (arrow 22), making a shorting contact point 11 where both electrodes contact each other. FIG. 2C shows a second view of the electrode assembly after venting with the "coning" 25 of the electrodes in the direction of the vent action.

Figure 3:
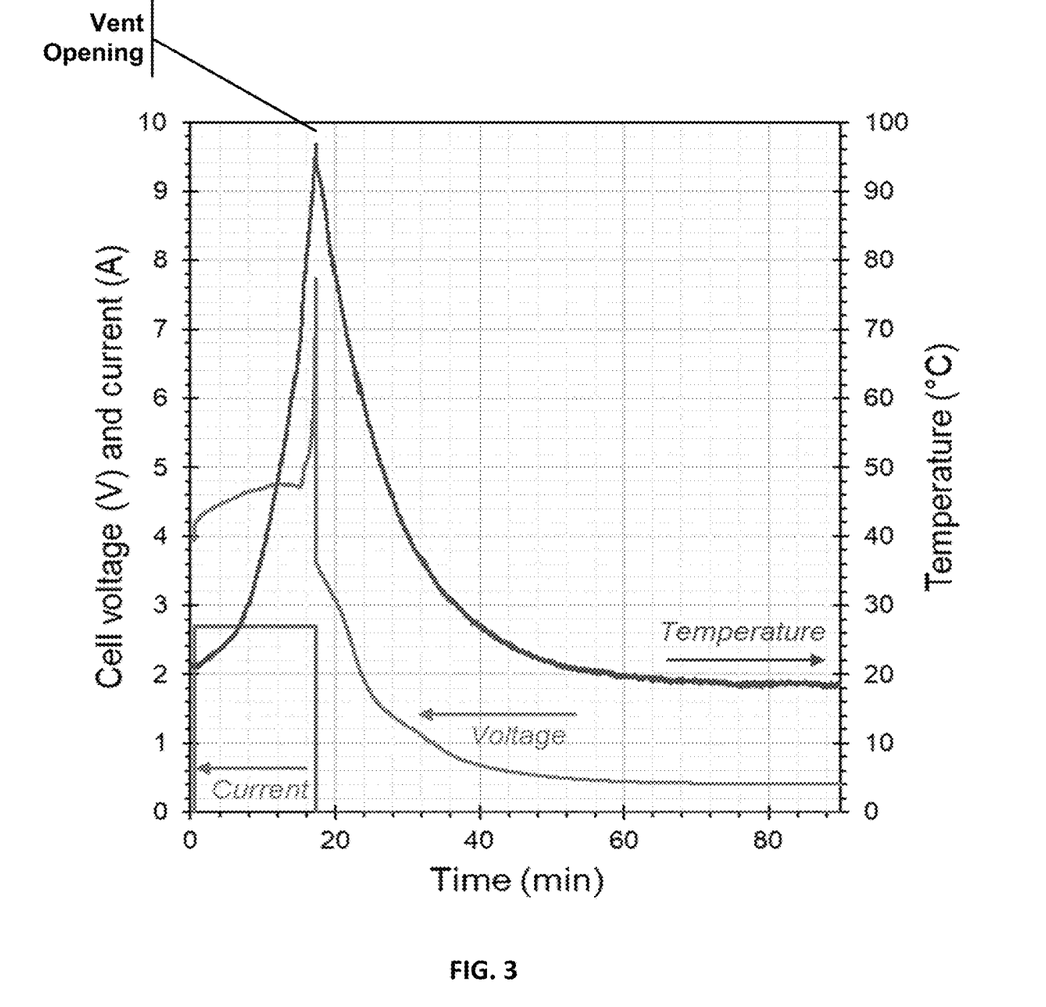
FIG. 3 is a graph showing a safety cell undergoing overcharge testing, venting, and discharging safely to a safe state.

FIG. 3 shows data of a safety cell undergoing overcharge testing. This safety cell has a graphite anode, a NMC811 cathode, a polypropylene separator, and a liquefied gas electrolyte, and the cell has a capacity of 2.7 Ah. The safety cell is charged with a continuous current of 2.7 Amp (1C rate). The cell temperature gradually increases after a nominal voltage of 4.2 V and reaches roughly 4.8 V followed by a rapid increase in voltage to 7.5 V and temperature of +95° C. At this high of a temperature, the liquefied gas electrolyte within the safety cell has an increased pressure of ~1,100 psi and is sufficient to open the vent on the safety cell, placing the safety cell into a venting configuration where the first and second electrodes are mechanically shorted, as indicated by the steady fall in voltage. The time to discharge to below 1V is roughly 10 minutes. This can be understood by the relatively high increase in cell impedance when the liquefied gas electrode vents from the safety cell, as described in Table 1 above. In a liquid electrolyte comparison cell, this would result in a low resistance electrical short, which would heat the cell rapidly and cause the cell to go into thermal runaway and catch fire, creating a safety hazard.

This invention is useful in areas such as battery recycling. Today, battery cells are often crushed or incinerated with no control over the cell's state of charge. A fully-charged battery can lead to violent fire and other hazards upon crush or incineration, creating a high cost associated with the recycling process. If the cell were in a safe state in which the electrodes were completely discharged, the cell would be safer to handle and would be cheaper to process in recycling.

An additional area of benefit would be using the present invention in conjunction with a liquefied gas electrolyte in which the electrolyte is comprised of a gas that is liquefied under pressure. Upon its end of life, the battery may be heated, allowing the cell to vent the liquefied gas electrolyte out from the cell. The liquefied gas electrolyte may be captured, purified, and reused for future use. Using the current invention, the remaining cell components would then be altered into the electrically-shorting configuration and discharged to a safe state. This cell would be very beneficial in a recycling application to save cost and lower any safety hazards.

While this document contains many specifics, these should not be construed as limitations on the scope of any invention or of what may be claimed, but rather as descriptions of features that may be specific to a particular embodiment of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A safety cell comprising:
   a cell housing (1);
   a lid assembly (3) comprising a shorting structure (7-1), the lid assembly (3) connected to the cell housing (1) via a vent (2) and an electrical isolator (7);
   an electrode assembly (5) housed within the cell housing (1), and comprising a first electrode separated from a second electrode by a separator, wherein:
      the first electrode is electrically connected to the cell housing (1);
      the second electrode is electrically connected to the shorting structure (7-1); and
      the first electrode, the second electrode and the separator are wound together;
   wherein the safety cell comprises a non-venting configuration and a venting configuration, wherein:
      the non-venting configuration is characterized by the vent (2) connecting the lid assembly (3) to the cell housing (1) such that the internal safety cell pressure is maintained at a pressure above atmospheric pressure; and
      the venting configuration is characterized by the steps of:
         (A) the vent (2) releasing the cell housing (1) from the lid assembly (3) when a predetermined internal pressure within the safety cell is exceeded;
         (B) venting the internal pressure;
         (C) the venting of the internal pressure dislodging the lid assembly (3) such that the shorting structure (7-1) makes electrical contact with the cell housing (1), discharging the safety cell, and
         (D) the venting of the internal pressure at least partially unwinding the electrode assembly (5) such that the first electrode makes electrical contact with the second electrode, discharging the safety cell.

2. The safety cell of claim 1, further comprising an electrolyte (13) within the cell housing (1).

3. The safety cell of claim 2, wherein the electrolyte (13) is a liquid electrolyte.

4. The safety cell of claim 2, wherein the electrolyte (13) is a liquified gas electrolyte.

5. The safety cell of claim 4, wherein the liquified gas electrolyte comprises a solvent with a vapor pressure above an atmospheric pressure of 100 kPa at a temperature of 293.15 K.

6. The safety cell of claim 1, wherein the vent (2) comprises a score.

7. The safety cell of claim 6, wherein the score is full circle, a half circle, two nearly complete half circles, a nearly complete single circle, a square or a rectangle.

8. The safety cell of claim 1, wherein the vent (2) comprises a burst disc.

9. A safety cell comprising:
   a cell housing (1);
   a lid assembly (3) comprising a shorting structure (7-1), the lid assembly (3) connected to the cell housing (1) via a vent (2) and an electrical isolator (7);
   an electrode assembly (5) housed within the cell housing (1), and comprising a first electrode separated from a second electrode by a separator, wherein:
      the first electrode is electrically connected to the cell housing (1);
      the second electrode is electrically connected to the shorting structure (7-1);
      the first electrode, the second electrode and the separator are wound together; and
   wherein the safety cell comprises a non-venting configuration and a venting configuration, wherein:
      the non-venting configuration is characterized by the vent (2) connecting the lid assembly (3) to the cell housing (1) such that the internal safety cell pressure is maintained at a pressure above atmospheric; and
      the venting configuration is characterized by the steps of:
         (A) the vent (2) releasing the cell housing (1) from the lid assembly (3) when a predetermined internal pressure within the safety cell is exceeded;
         (B) venting the internal pressure;
         (C) the venting of the internal pressure dislodging the lid assembly (3) such that the shorting structure (7-1) makes electrical contact with the cell housing (1), discharging the safety cell; and
         (D) the venting of the internal pressure at least partially unwinding the electrode assembly (5) such that the first electrode makes electrical contact with the lid assembly (3), discharging the safety cell.

10. A safety cell comprising:
    a cell housing (1);
    a lid assembly (3) connected to the cell housing (1) via a vent (2);
    an electrode assembly (5) housed within the cell housing (1), and comprising a first electrode separated from a second electrode by a separator, wherein:
       the first electrode, the second electrode and the separator are wound together; and
       the second electrode is electrically connected to the lid assembly (3);
    wherein the safety cell comprises a non-venting configuration and a venting configuration, wherein:
       the non-venting configuration is characterized by the vent (2) connecting the lid assembly (3) to the cell housing (1) such that the internal safety cell pressure is maintained at a pressure above atmospheric; and
       the venting configuration is characterized by the steps of:
          (A) the vent (2) releasing the cell housing (1) from the lid assembly (3) when a predetermined internal pressure within the safety cell is exceeded;
          (B) venting the internal pressure; and
          (C) the venting of the internal pressure at least partially unwinding the electrode assembly (5) such that the first electrode makes electrical contact with the second electrode and/or the lid assembly (3), discharging the safety cell.

11. The safety cell of claim 10, further comprising an electrolyte (13) within the cell housing (1).

12. The safety cell of claim 11, wherein the electrolyte (13) is a liquid electrolyte.

13. The safety cell of claim 11, wherein the electrolyte (13) is a liquified gas electrolyte.

14. The safety cell of claim 13, wherein the liquified gas electrolyte comprises a solvent with a vapor pressure above an atmospheric pressure of 100 kPa at a temperature of 293.15 K.

15. The safety cell of claim 10, wherein:
the lid assembly comprises a shorting structure (7-1), and the second electrode is electrically connected to the shorting structure (7-1); and
the venting configuration is further characterized by the step:
(D) the venting of the internal pressure dislodging the lid assembly (3) such that the shorting structure (7-1) makes electrical contact with the cell housing (1), discharging the safety cell.

16. The safety cell of claim 10, wherein the vent (2) comprises a score.

17. The safety cell of claim 16, wherein the score is full circle, a half circle, two nearly complete half circles, a nearly complete single circle, a square or a rectangle.

18. The safety cell of claim 10, wherein the vent (2) comprises a burst disc.

19. A safety cell comprising:
a cell housing (1) with a vent;
a lid assembly (3) connected to the cell housing (1);
an electrode assembly (5) housed within the cell housing (1), and comprising a first electrode separated from a second electrode by a separator, wherein:
the first electrode, the second electrode and the separator are wound together; and
the first electrode is electrically connected to the cell housing (1);
wherein the safety cell comprises a non-venting configuration and a venting configuration, wherein:
the non-venting configuration is characterized by the vent (2) in a closed configuration such that the internal safety cell pressure is maintained at a pressure above atmospheric; and
the venting configuration is characterized by the steps of:
(A) the vent (2) opening to vent the internal pressure when a predetermined internal pressure within the safety cell is exceeded; and
(B) the venting of the internal pressure at least partially unwinding the electrode assembly (5) such that the second electrode makes electrical contact with the first electrode and/or the cell housing (1), discharging the safety cell.

20. The safety cell of claim 19, further comprising an electrolyte (13) within the cell housing (1).

21. The safety cell of claim 20, wherein the electrolyte (13) is a liquid electrolyte.

22. The safety cell of claim 20, wherein the electrolyte (13) is a liquified gas electrolyte.

23. The safety cell of claim 22, wherein the liquified gas electrolyte comprises a solvent with a vapor pressure above an atmospheric pressure of 100 kPa at a temperature of 293.15 K.

24. The safety cell of claim 19, wherein the vent comprises a score.

25. The safety cell of claim 24, wherein the score is full circle, a half circle, two nearly complete half circles, a nearly complete single circle, a square or a rectangle.

26. The safety cell of claim 19, wherein the vent (2) comprises a burst disc.

27. The safety cell of claim 19, wherein the vent (2) is located on a bottom wall (1-1) of the cell housing (1).

* * * * *